United States Patent Office 3,634,456
Patented Jan. 11, 1972

---

3,634,456
BIS-QUINONEMETHIDE PRECURSORS
Mark C. Chen and William A. Sheppard, Wilmington, Del., assignors to E. I. du Pont de Nemours and Company, Wilmington, Del.
No Drawing. Filed Mar. 26, 1969, Ser. No. 810,842
Int. Cl. C07d 89/18, 15/08; C07c 49/62
U.S. Cl. 260—327          3 Claims

ABSTRACT OF THE DISCLOSURE (1) A new composition of matter of the formula

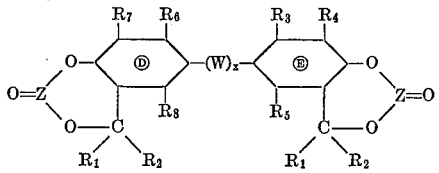

wherein $x=0$ or 1, and W is a bifunctional aliphatic or aromatic radical, oxygen, sulfur, oxydialkyl, or thiodialkyl radical; $R_1$ and $R_2$ are each independently a lower alkyl or haloalkyl radical; $R_3$, $R_4$, $R_5$, $R_6$, $R_7$, and $R_8$ can each independently be hydrogen, a lower alkyl radical or halogen; and Z is either sulfur or carbon.

(2) A process for making the new composition of matter described in (1) above by contacting a bisphenol

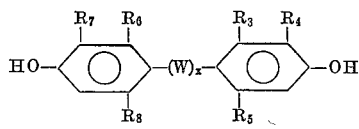

with a lower alkyl ketone

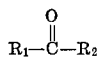

and further contacting the intermediate bis-t-benzyl alcohol with either thionyl chloride or phosgene in the presence of a tertiary amine.

(3) A process for curing by heating with the new compounds of section (1) organic polymers containing "active hydrogen" atoms, "activated double bonds," or allylic chlorine.

BACKGROUND OF THE INVENTION

This invention is directed to a new class of chemical compounds, to a process for their manufacture, and to their use in curing various classes of organic polymers.

Substituted p-quinonemethides have been recently reported by Sheppard [J. Org. Chem. 33, 3297 (1968)] who states that free quinonemethides are unstable unless substituted both in the 2,6 and C–7 positions. Sheppard prepared stable 2,6-dialkyl-7,7-bis(fluoroalkyl)quinonemethides (I)

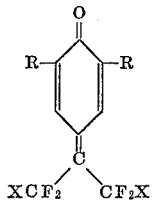

where R is methyl or isopropyl, and X is fluorine or chlorine.

Sheppard states that o-benzoquinonemethides are less stable than the p-isomers and have not been isolated.

Bis-quinonemethides have not been reported in the past.

SUMMARY OF THE INVENTION

It has now been discovered that precursors of certain bis-benzoquinonemethides (BQM) can be made readily and are stable at normal temperature. These precursors can be represented by the general Formula II

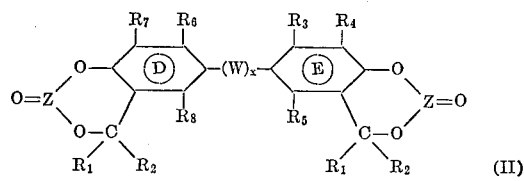

where $x=0$ or 1, and W is a bifunctional aliphatic or aromatic radical, such as alkylene, alkylidene or arylene having 1–16 carbon atoms; oxygen; sulfur; and the radical —A—Y—B—, where A and B can each independently be lower alkylene or arylene, and Y is oxygen or sulfur. Rings D and E can also be joined to each other directly (where $x=0$). $R_1$ and $R_2$ can each independently be an alkyl radical of one to four carbon atoms, optionally substituted by one or more identical or different halogen atoms. $R_3$, $R_4$, $R_5$, $R_6$, $R_7$, and $R_8$ can each independently be hydrogen, an alkyl radical having one to four carbon atoms, or halogen; and Z is either sulfur or carbon. These compounds are either cyclic sulfites or cyclic carbonates.

When heated to a sufficiently high temperature, generally about 150° C., a precursor (II) decomposes liberating a free BQM which is unstable and cannot be isolated. In the presence of a suitable substrate, however, the BQM reacts to give new and useful products. Organic polymers which have reactive sites can be exposed to BQM's generated during the thermal decomposition of precursor (II), with resultant crosslinking or chain-extension of the polymer molecule. Generally a reactive site can be an "active hydrogen" atom, "activated double bond," or an allylic chlorine.

BQM precursors of this invention can be prepared in a simple manner from readily available materials such as certain bisphenols. Preparation of a representative BQM precursor, bis-sulfite ester of 3,3'-isopropylidenebis[6-hydroxy-α,α-bis(trifluoromethyl)benzylalcohol] is illustrated by the following Equations 1 and 2:

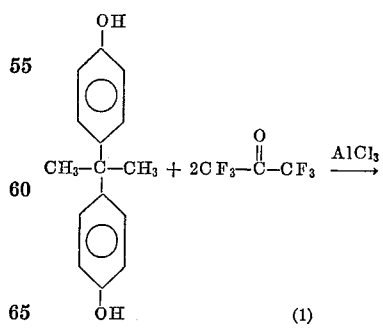

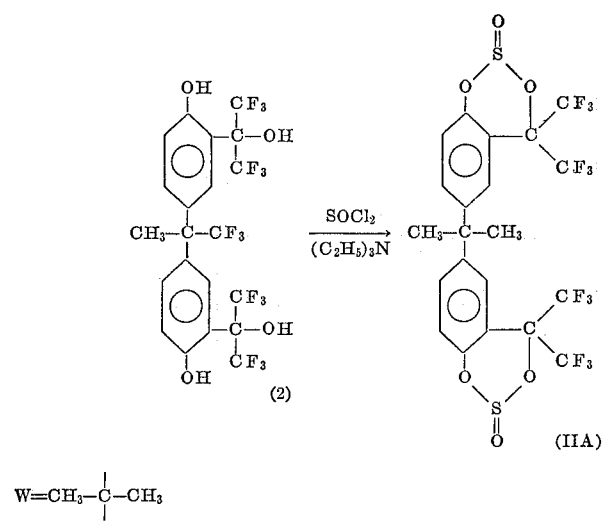

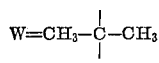
X=1
$R_1$ and $R_2$=$CF_3$
$R_3$, $R_4$, $R_5$, $R_6$, $R_7$, and $R_8$=H
Z=S

DETAILED DESCRIPTION OF THE INVENTION

BQM precursors (II) are made from bisphenols via tertiary hydroxybenzyl alcohols. The starting bisphenols can be represented by the Formula III

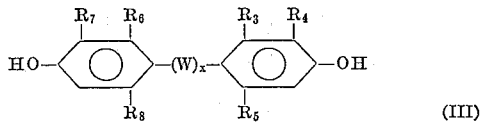

in which the meaning of $x$, W, $R_3$, $R_4$, $R_5$, $R_6$, $R_7$, and $R_8$ is the same as in Formula II. When W is alkylene, it can be for example methylene, ethylene, 1,3-propylene, 1,2-propylene, tetramethylene, 2-methyl-1,3-propylene, 2-methyl-1,2-propylene pentamethylene, and hexamethylene. When W is alkylidene, it can be for example ethylidene, propylidene, isopropylidene, butylidene, sec-butylidene, pentylidene, and hexylidene. W can also be a cycloalkylene radical such as 1,4-cyclohexylene, 1,3-cyclohexylene, cyclopentylene, cycloheptylene (all isomers), and cyclooctylene (all isomers). Furthermore, W can be an arylene radical (including alkyl- and halo-substituted arylene radicals) such as m-phenylene, p-phenylene, o-phenylene, methyl phenylene (all isomers), dimethylphenylene (all isomers), trimethylphenylene, tetramethylphenylene, 1,4-naphthylene, 1,5-naphthylene, 2,6-naphthylene, chlorophenylene, and dichlorophenylene.

When W is an —A—Y—B-radical, Y can be either oxygen or sulfur, while A and B can independently be an alkylene radical, such as methylene, ethylene, 1,3-propylene, 1,2-propylene, tetramethylene, pentamethylene, and hexamethylene; or an arylene such as o-phenylene, m-phenylene, p-phenylene, 1,4-naphthylene, 1,5-naphthylene, and 2,6-naphthylene.

Each of $R_3$, $R_4$, $R_5$, $R_6$, $R_7$, and $R_8$ radicals can be hydrogen; or a $C_1$–$C_4$ alkyl radical, such as methyl, ethyl, propyl, isopropyl, butyl, isobutyl, sec-butyl, and t-butyl. Each of these radicals can also be a halogen, i.e., fluorine, chlorine, or bromine.

In the first step of the reaction, the bisphenol is contacted with a ketone in the presence of a Friedel-Crafts catalyst, in the manner shown in Equation 1. At least two moles of the ketone per mole of bisphenol are required, but an excess of 15–30% is usually preferred. The ketone can be represented by the formula

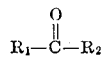

where each of $R_1$ and $R_2$ can be independently an alkyl radical, such as methyl, ethyl, propyl, isopropyl, butyl, isobutyl, sec-butyl, and t-butyl; or a haloalkyl radical, such as trifluoromethyl, difluoromethyl, difluorochloromethyl, perfluoroethyl, trifluorodichloroethyl, perfluoropropyl, perchloropropyl, perfluorobutyl, bromobutyl, and chlorobutyl.

Friedel-Crafts catalysts which can be used in this reaction are well known to those skilled in the art. They are classified as Lewis acids, i.e., substances which can fill the valence shell of one of their atoms with an unshared pair of electrons from another molecule. They include aluminum chloride, zinc chloride, ferric chloride, cupric chloride, boron fluoride, and magnesium chloride. The Friedel-Crafts catalyst is present in only small amounts, generally not over 15% of the weight of bisphenol.

The condensation of a bisphenol with a ketone in the presence of a Friedel-Crafts catalyst is usually carried out in solution in a solvent which itself is inert under the reaction conditions, such as nitrobenzene. The reaction can be run either at atmospheric pressure or at autogenous pressure at a temperature of from about 0 to 300° C. Highest yields and purest products are obtained at about 50 to 150° C.

BQM precursors (II) are made from the corresponding bis-t-benzyl alcohols by esterification with either thionyl chloride or phosgene in the presence of a tertiary amine such as triethylamine, tributylamine, N,N-dimethylaniline, pyridine, N-methylmorpholine, and benzyldimethylamine; although a small amount of the amine is sufficient to act as a catalyst, a stoichiometric amount or even a large excess of the amine may be present. It then also can be a proton acceptor and/or a reaction solvent.

A solvent is not necessary, but a solvent which is inert under the conditions of the reaction, for example, a hydrocarbon or an ether, can be used.

Thionyl chloride and phosgene are used in at least stoichiometric amounts. A large excess of either acid chloride is not harmful and in fact can also serve as a solvent.

Although this esterification reaction can be run at low to moderate temperatures, such as —50° C. to 25° C., it is generally preferred to complete the reaction at a higher temperature, for instance at the reflux temperature of thionyl chloride (78.8° C.); but still higher temperatures up to about 150° C. can be used.

Free BQM's are formed from the precursors of the present invention by heating to a temperature above about 120° C. and preferably to about 150–180° C. Although these free BQM's are unstable and cannot be isolated, they react readily in situ with compounds which have an "active hydrogen" atom. The presence of an active hydrogen atom can be demonstrated by Zerewitinoff technique using a Grignard reagent, such as methyl magnesium iodide. The latter reacts with active hydrogen, producing methane. Typical compounds which have at least one active hydrogen atom are alcohols, primary and secondary amines, free and mono-N-substituted amides, imides, carbamates, phenols, carboxylic acids, etc.

BQM's also react with unsaturated compounds having an "activated double bond" or an allylic chlorine. For the purposes of this invention, an "activated double bond" is at least a 1,1-disubstituted double bond, where the substituents are electron-donating groups, such as for example alkyl groups.

This ability to react with unsaturated compounds makes BQM's useful as crosslinking and chain-extending agents for elastomers. Elastomers which have activated double bonds and, therefore, can be cured by BQM's include natural rubber, polyisoprene and copolymers of alpha-olefins with ethylidenenorbornene, and methylenenorbornene.

Elastomers containing free hydroxyl groups, such as hydroxylated terpolymer of ethylene/propylene/1,4-hexadiene can be cured by reaction of their active hydrogen atoms with BQM's. Elastomers having an allylic chlorine include chloroprene polymers and copolymers.

Curing elastomers with BQM's is done at temperatures above 120° C., preferably within the range 150–160° C. Below 120° C. the generation of BQM's from their precursors is generally too slow to have practical utility, while above about 160° the generation of BQM's is quite rapid and accompanied by self-polymerization. No solvent is generally necessary to disperse a BQM precursor in the elastomer because these precursors are very miscible with elastomer stocks. If a solvent is necessary, however, any aromatic hydrocarbon, most aliphatic hydrocarbons, and most polar solvents are suitable for dissolving BQM precursors.

Curing elastomers with BQM's has the advantage that cured elastomers are free of objectionable odor (such as often is imparted by sulfur compounds, commonly used for this purpose). Furthermore, because of the excellent dispersibility of BQM precursors in elastomer stocks, blooming of vulcanizing agent is absent. While the amount of a BQM precursor compounded with an elastomer stock depends on the stoichiometry of the chain-extending reaction, it generally is 2.0–12 parts by weight per 100 parts of the elastomer.

Stocks are compounded in a conventional manner, for example, on a rubber mill. Usual ingredients, such as fillers, pigments, antioxidants, and extenders can be compounded with elastomer material. A compounded elastomer stock is usually cured by heating at 150–160° C. for 30–60 minutes in conventional equipment, such as a press, a mold, or an oven. The cured elastomers have good physical properties which compare favorably with those of elastomers vulcanized by prior art processes.

The invention is illustrated by the following examples in which all parts, proportions, and percentages are based on weight, unless otherwise indicated.

The modulus, tensile strength, elongation at break, and permanent set at break of the vulcanizates reported in the examples are determined according to the ASTM procedure D–412–66 (for permanent set, Section 5.5 is modified by use of a 5-minute hold time).

EXAMPLE 1

(A) Preparation of 3,3'-isopropylidenebis [6-hydroxy-α,α-bis(trifluoromethyl)benzyl alcohol] (IV–A)

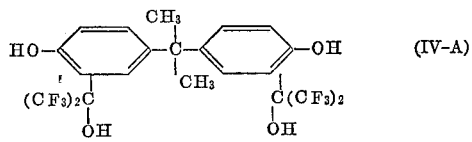 (IV–A)

A mixture of 23 grams (0.10 mol) of 4,4'-isophopylidenediphenol (commercially available as bisphenol-A), 2 grams of anhydrous aluminum trichloride, and 50 grams of nitrobenzene is charged into a 240-ml. Hastelloy pressure vessel which is subsequently cooled and placed under vacuum. After 40 grams (0.25 mol) of hexafluoroacetone have been added, the vessel is closed and agitated under autogenous pressure at 60° C. for 8 hours. 3,3'-isopropylidene - bis[6 - hydroxy-α,α-bis(trifluoromethyl)benzyl alcohol] is formed as an insoluble light-colored powder which is filtered off, washed with methylene chloride and dried. This dialcohol (Compound IV–A), melting at 203–206° C., is obtained in 66% yield (37.2 grams). Infrared and nuclear magnetic resonance (H¹ and F¹⁹) spectra confirm the assigned structure.

(B) Preparation of the bis sulfite ester of 3,3'-isopropylidene-bis[6-hydroxy-α,α-bis(trifluoromethyl)benzyl alcohol] (II–A)

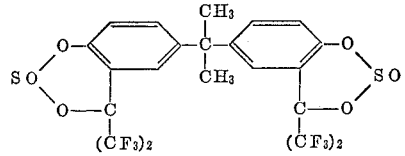

After a 10-gram portion of Compound IV–A has been dissolved in 50 milliliters of agitated thionyl chloride, one milliliter of triethylamine is added. Mild heat evolution occurs. The solution is refluxed for one hour and poured into a large excess of ice and water to hydrolyze all unchanged thionyl chloride. Compound II–A, the bis sulfite ester of Compound IV–A, separates as a semi-solid which is extracted with methylene chloride. The methylene chloride solution is dried and evaporated, leaving a residue—13.2 grams of oily crystals—which is washed with pentane. Compound II–A is obtained in a 9-gram yield (77% of theory) as white crystals melting at 87–89° C. After recrystallization from cyclohexane, Compound II–A melts at 88.5–90° C. Infrared and nuclear magnetic resonance (H¹ and F¹⁹) spectra confirm its assigned structure.

(C) Formation of the BQM from Compound II–A

When Compound II–A is heated, the molten material turns yellow and then orange as the temperature is raised; Compound II–A evolves SO₂, slowly at about 150° C. and rapidly at 170–180° C. The orange color is attributed to the presence of the quinonemethide.

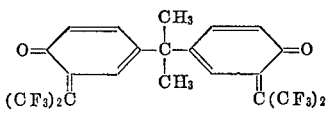

EXAMPLE 2

(A) Preparation of 3,3-isopropylidenebis [6-hydroxy-5-methyl-α,α-bis(trifluoromethyl)benzyl alcohol] (Compound IV–B)

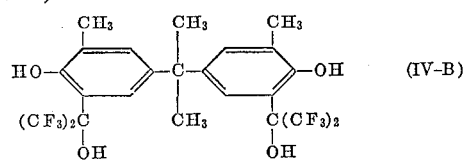 (IV–B)

The procedure of Part A of Example 1 is repeated except that 4,4'-isopropylidenedi-o-cresol (commercially available as bisphenol-C) is substituted for 4,4'-isopropylidenediphenol. Compound IV–B, 3,3-isopropylidenebis[6-hydroxy-5-methyl-α,α-bis(trifluoromethyl)benzyl alcohol], has a melting point of 161–162° C.

(B) Preparation of the bis sulfite ester of [3,3-isopropylidene bis[6 - hydroxy-5-methyl-α,α-bis(trifluoromethyl) benzyl alcohol] (compound II–B)

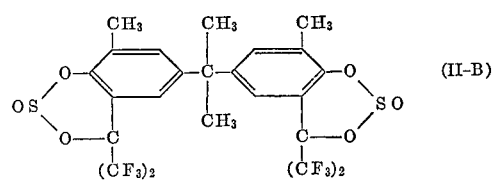 (II–B)

The procedure of Part B of Example 2 is repeated except that Compound IV–B is substituted for Compound IV–A. The resulting bis sulfite ester, Compound II–B, melts at 109–110° C.

Compound II–B may be substituted for Compound II–A in the procedures of the remaining examples to obtain similar results.

EXAMPLE 3

(A) Preparation of hydroxylated EPDM polymer A (1) EPDM polymer A.—EPDM polymer A is made by copolymerizing ethylene with propylene and 1,4-hexadiene in solution in tetrachloroethylene in the presence of a coordination catalyst formed in situ by mixing vanadium oxytrichloride with diisobutylaluminum monochloride. EPDM polymer A has a Mooney viscosity (ML–1+4/250° F.) of about 70 and contains about 40 weight percent propylene units, 6.6 weight percent total 1,4-hexadiene units and 53.4 weight percent ethylene units.

The sulfur-curable unsaturation amounts to about 0.61 mol/kg. (by infrared analysis).

(2) Hydroxylation of EPDM polymer A.—30.3 liters (50.9 kg.) of a 4.6 weight percent tetrachloroethylene solution of EPDM polymer A (2330 grams), 15.15 liters of tetrachloroethylene and 16.9 liters of 98% formic acid are charged to a 75.7 liter Pfaudler kettle at 25° C. Then 7860 ml. of 30% aqueous hydrogen peroxide is added dropwise over a 75 minute period, cooling when necessary to keep the temperature below 35° C. Stirring with intermittent cooling is continued for 90 minutes; then, 5 grams of 4,4' - thio - bis(3 - methyl) - 6 - tert butylphenol antioxidant is added. After five minutes, stirring is stopped and the reaction mixture allowed to separate for 30–45 minutes. The tetrachloroethylene lower phase, containing hydroxylated EPDM polymer A, is drawn off and the formic acid present is partially neutralized with ammonium hydroxide. The polymer solution is then pumped to a modified centrifugal pump, thoroughly mixed with water and introduced into a glass settling tower where the separating organic layer is automatically fed to the next washing pump. After leaving the third washing and settling stage, the organic layer, free now from reactants and salts, is dropped into a collection vessel. The hydroxylated EPDM polymer A, isolated by drum drying weighs 2040 grams. Its inherent viscosity, measured on a 0.1% solution in tetrachloroethylene at 30° C., is 2.95, its Mooney viscosity (ML–1+4/250° F.) is 67, and its unsaturation amounts to 0.35 mol/kg. (measured by infrared analysis). The polymer has an OH number of 20, equivalent to 0.36 mol/kg. of product.

(B) Vulcanization of hydroxylated EPDM polymer A with compound II–A

Samples of hydroxylated EPDM polymer A, made by the procedure of part A–2 above, are compounded on a rubber roll mill in accordance with the following recipes:

| Component | Parts | |
|---|---|---|
| | Stock 1 | Stock 2 |
| Hydroxylated EPDM Polymer A | 100 | 100 |
| SAF carbon black | 50 | 50 |
| Stearic acid | 1 | 1 |
| Compound II–A | 3 | 6.5 |

The resulting stocks 1 and 2 are then cured in a press at 160° C. for 60 minutes. Typical vulcanizate properties at 25° C. are illustrated in the following Table I:

TABLE I

| Component | Stock 1 | Stock 2 |
|---|---|---|
| Modulus at 100% ext., p.s.i | 500 | 650 |
| Modulus at 200% ext., p.s.i | 1,850 | 2,450 |
| Tensile strength, p.s.i | 2,700 | 3,000 |
| Elongation at break, percent | 240 | 220 |
| Permanent set at break, percent | 2.5 | 1.5 |

EXAMPLE 4

(A) Preparation of EPDM polymer B

Ethylene, propylene, and 5-ethylidene-2-norbornene are copolymerized in solution in tetrachloroethylene at 25° C. in a continuous, two-phase, atmospheric pressure reactor in the presence of a coordination catalyst formed in situ by combining vanadium tris(acetylacetonate) with diisobutylaluminum monochloride. EPDM polymer B which results has an inherent viscosity of 2.09 (measured at 30° C. on a solution of 0.1 gram of elastomer in 100 ml. of tetrachloroethylene); its Wallace Plasticity is 32. The monomer unit composition is as follows: ethylene, 65%; propylene, 32%; 5-ethylidene-2-norbornene, 3%.

(B) Vulcanization of EPDM polymer B with compound II–A

Samples of the EPDM polymer B of part A above are compounded on a rubber roll mill in accordance with the following recipes:

| Component | Parts | |
|---|---|---|
| | Stock 1 | Stock 2 |
| EPDM Polymer B | 100 | 100 |
| SAF carbon black | 50 | 50 |
| Compound II–A | 6.5 | 12 |

The resulting Stocks 1 and 2 are then cured in a press at 150° C. for 30 minutes.

Typical vulcanizate properties at 25° C. are illustrated in the following Table II:

TABLE II

| | Stock 1 | Stock 2 |
|---|---|---|
| Modulus at 100% ext., p.s.i | 350 | 402 |
| Modulus at 300% ext., p.s.i | 950 | 1,250 |
| Tensile strength, p.s.i | 2,150 | 2,750 |
| Elongation at break, percent | 600 | 490 |
| Permanent set at break, percent | 71.5 | 40 |

EXAMPLE 5

(A) Preparation of chloroprene copolymer A

Chloroprene copolymer A is made by copolymerizing 98 parts of 2-chloro-1,3-butadiene and 2 parts of 2,3-dichloro-1,3-butadiene in the presence of 0.4 part of sulfur and 0.4 part of diethyl xanthogen disulfide in emulsion and is stabilized with 2,6-di-tert-butyl-4-phenylphenol. The Mooney viscosity at 100° C., using the large rotor (ML–1+2.5) is about 70.

(B) Preparation of chloroprene copolymer B

Chloroprene copolymer B is made by copolymerizing 98.6 parts of 2-chloro-1,3-butadiene and 1.4 parts of methacrylic acid in the presence of 0.9 part of diisopropyl xanthogen disulfide in emulsion. The Mooney viscosity at 100° C., using the large rotor (ML–1+2.5) is about 50.

(C) Preparation of polychloroprene I

Polychloroprene I is prepared by persulfate catalyzed mercaptan-modified emulsion polymerization of 2-chloro-1,3-butadiene at 40° C. The Mooney viscosity at 100° C. (ML–1+2.5) is about 50.

(D) Curing chloroprene polymers with Compound II–A

Samples of chloroprene copolymers A and B and polychloroprene I are separately compounded on a rubber roll mill according to the following recipes (parts per 100 parts of polymer):

| | Stocks | | | | |
|---|---|---|---|---|---|
| | 1 | 2 | 3 | 4 | 5 |
| Polymer | (1) | (1) | (2) | (3) | (3) |
| MT carbon black | 100 | 100 | 0 | 0 | 0 |
| SAF carbon black | 0 | 0 | 50 | 50 | 50 |
| Stearic acid | 1 | 1 | 1 | 1 | 1 |
| ZnO | 5 | 5 | 0 | 2 | 2 |
| Compound II–A | 2 | 6.5 | 2 | 2 | 2 |

1 Copolymer A.
2 Copolymer B.
3 Polychloroprene I.

All stocks are then cured in a press at 160° C. for 60 minutes. Typical vulcanizate properties at 25° C. are given in Table III below:

TABLE III

| | Stocks | | | | |
|---|---|---|---|---|---|
| | 1 | 2 | 3 | 4 | 5 |
| Modulus at 100% ext., p.s.i | 1,300 | 1,800 | 1,200 | 1,500 | N.d. |
| Tensile strength, p.s.i | 2,300 | 2,200 | 1,700 | 2,750 | 1,600 |
| Elongation at break, percent | 200 | 120 | 150 | 150 | 70 |
| Permanent set at break, percent | 4 | 1 | 3 | 3 | 1 |

EXAMPLE 6

(A) Preparation of polychloroprene II 2-chloro-1,3-butadiene is polymerized in emulsion at 40° C. with a persulfate catalyst in the presence of diethyl xanthogen disulfide modified. The resulting polychloroprene II has a Mooney viscosity (ML-1+2.5) at 100° C. of 80.

(B) Vulcanization of polychloroprene II with compound II-A

Polychloroprene II is compounded on a rubber roll mill according to the following recipe:

|  | Parts |
|---|---|
| Polychloroprene II | 100 |
| SRF carbon black | 85 |
| Stearic acid | 0.5 |
| MgO ("Maglite D") | 4 |
| ZnO | 5 |
| Compound II-A | 7 |

After this composition has been cured in a press for 20 minutes at 153° C., the resulting vulcanizate typically has the following properties at 25° C.:

| | |
|---|---|
| Modulus at 100% ext., p.s.i. | 3050 |
| Tensile strength, p.s.i. | 3450 |
| Elongation at break, percent | 110 |
| Permanent set at break, percent | 0 |

EXAMPLE 7

Preparation and crosslinking of an ethylene/methacrylic acid copolymer

A thermoplastic random ethylene dipolymer containing 11.3 weight percent incorporated methacrylic acid is prepared according to the general procedures of British Pat. 963,380.

A mixture of the copolymer with 0.7 equivalent of Compound II-A is crosslinked to a thermoset article by heating in mesitylene for about 20 minutes at 150° C.

EXAMPLE 8

Chain extension of hydroxylated polybutadiene

A commercial hydroxylated polybutadiene has a viscosity at 30° C. of 50 poise. The butadiene monomer units are incorporated 80% 1,4- and 20% 1,2. Present in each kilogram of polymer are about 18.5 mols of ethylenic unsaturation and 8 mols of hydroxyl groups. The equivalent (weight based on hydroxyl content) is about 1250.

When the above liquid, hydroxylated polybutadiene is mixed at 150° C. with an equivalent proportion of Compound II-A for about 15 minutes, a thick, rubbery material forms. On cooling, this product is obtained as a soft rubber, insoluble in benzene.

EXAMPLE 9

Chain extension of polytetramethylene ether glycol with BQM compound II-A

Polytetramethylene ether glycol (number-average molecular weight 2000) is melted and mixed with equimolar amount of Compound II-A. The mixture is heated with stirring to 160° C. and held at 160° C. for 25 minutes. A viscous liquid polymer is produced having a number-average molecular weight of 3800. Then, 0.8 molar proportion of 4,4-methylenebis(phenyl isocyanate) is added. The mixture is agitated at 160° C. for 10 minutes. The resulting product is a more viscous liquid polymer, which immediately changes to a hard rubber on addition of a catalytic amount of triethylamine. In the absence of Compound II-A, the final product is a viscous liquid, even after addition of triethylamine.

EXAMPLE 10

Copolymerization of compound II-A with small monomers (A) 1,4-butanedithiol copolymer.—Compound II-A is added to an equimolar amount of 1,4-butanedithiol at room temperature. The resulting agitated liquid composition is heated to 140° C. and kept at 140° C. for ten minutes while the polymerization continues. Heat is then removed. When cooled, the polymer solidifies. This thermoplastic product has a number-average molecular weight of about 1,240.

(B) Adipic acid copolymer.—Compound II-A is mixed with an equimolar amount of powdered adipic acid at room temperature and heated to form a homogeneous liquid composition. The temperature is slightly above 150° C. After about 10 minutes, heat is removed from the agitated melt. The resulting copolymer solidifies on cooling. This thermoplastic product has a number-average molecular weight of about 2760.

(C) Copolymer of dihydrazide of adipic acid.—Compound II-A is mixed with an equimolar proportion of the dihydrazide of adipic acid at room temperature and heated. At 130° C. gas is vigorously evolved. Heating is continued over a 20-minute period. The final temperature is 170° C. The crosslinked polymeric product melts in the range 90-100° C. and is insoluble in acetone.

What is claimed is:

1. A compound of the formula

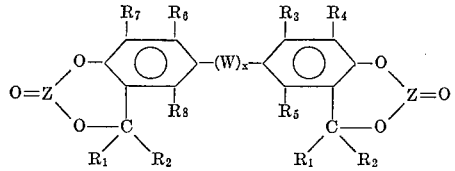

wherein X is 0 or 1, and W is a bifunctional radical selected from the group: $C_1-C_{16}$ alkylene, $C_2-C_{16}$ alkylidene, $C_6-C_{16}$ arylene, halo- substituted $C_6-C_{16}$ arylene, oxygene, sulfur, and the bifunctional radical A—Y—B, wherein A and B can each independently be lower alkylene or $C_6-C_{10}$ arylene and Y is oxygen or sulfur;

$R_1$ and $R_2$ are $C_1-C_4$ alkyl radicals or halo-substituted $C_1-C_4$ alkyl radicals, where the halogen can be one or more of the group fluorine, chlorine and bromine;

$R_3$, $R_4$, $R_5$, $R_6$, $R_7$ and $R_8$ can each independently be hydrogen, $C_1-C_4$ alkyl radicals or halogen;

and Z is either sulfur or carbon.

2. A compound of claim 1, where $x=1$; W is the isopropylidene radical; each of $R_1$ and $R_2$ is the trifluoromethyl radical; each of $R_3$, $R_4$, $R_5$, $R_6$, $R_7$, and $R_8$ is hydrogen; and Z is sulfur.

3. A compound of claim 1, where $x=1$; W is the isopropylidene radical; each of $R_1$ and $R_2$ is the trifluoromethyl radical; each of $R_3$, $R_5$, $R_6$, and $R_8$ is hydrogen; each of $R_4$ and $R_7$ is the methyl radical; and Z is sulfur.

References Cited

UNITED STATES PATENTS 3,221,025   11/1965   Prochaska _____ 260—340.2

FOREIGN PATENTS 810,376   3/1959   Great Britain _____ 260—327

OTHER REFERENCES

Farah, et al., J. Org. Chem. 30:1003–5 (4/65).
Sheppard, J. Org. Chem. 33:3297–306 (8/68).

NORMA S. MILESTONE, Primary Examiner

C. M. SHURKO, Assistant Examiner

U.S. Cl. X.R.

260—66, 340.2, 396 N